J. SEPPO.
FISH SCREEN.
APPLICATION FILED JAN. 3, 1914.

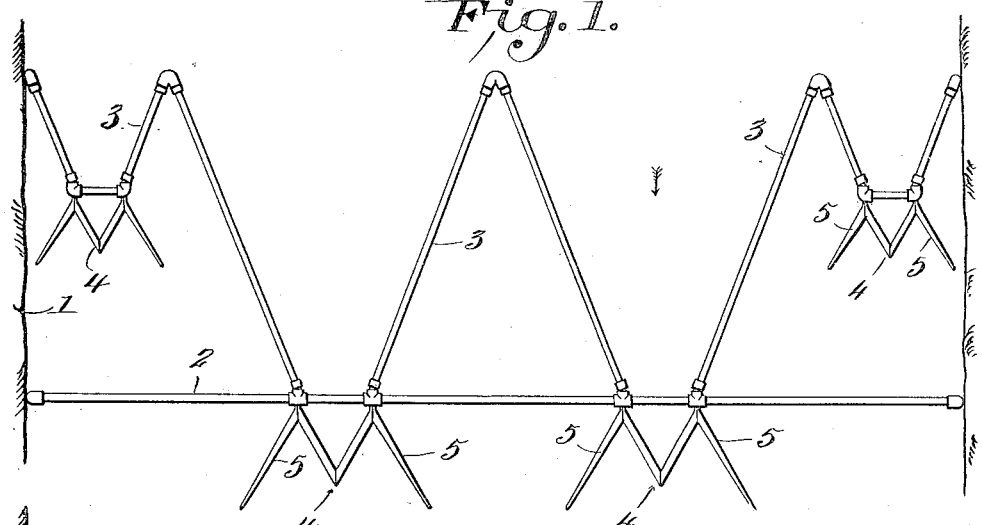
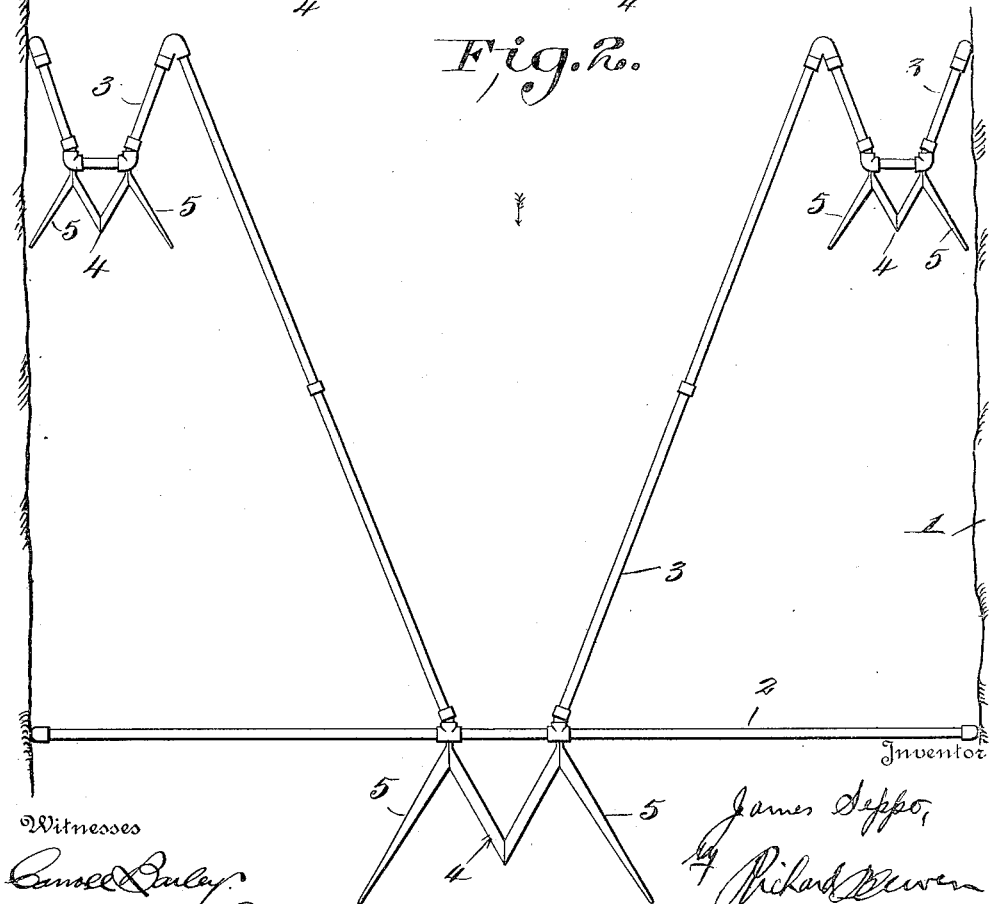

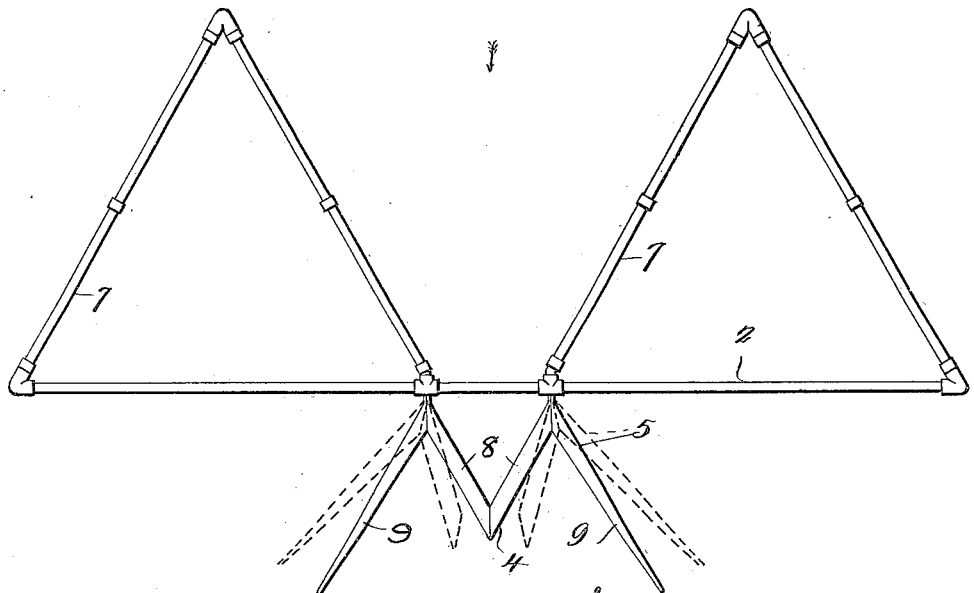
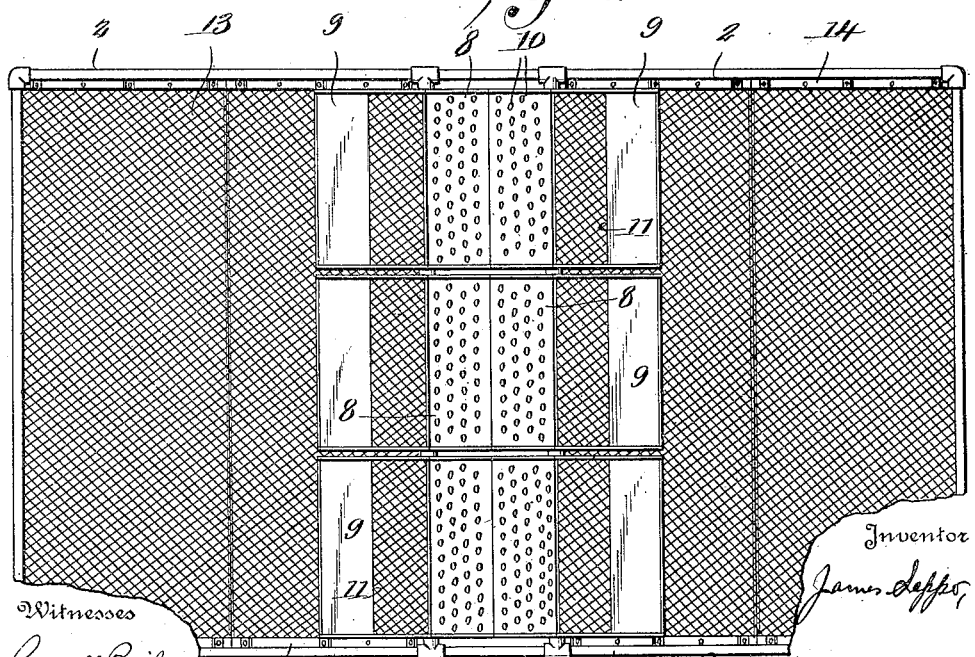

1,132,041.

Patented Mar. 16, 1915.
3 SHEETS—SHEET 3.

Witnesses

Inventor
James Seppo,
By
his Attorney

UNITED STATES PATENT OFFICE.

JAMES SEPPO, OF NASHWAUK, MINNESOTA.

FISH-SCREEN.

1,132,041.  Specification of Letters Patent.  Patented Mar. 16, 1915.

Application filed January 3, 1914. Serial No. 810,216.

*To all whom it may concern:*

Be it known that I, JAMES SEPPO, citizen of the United States, residing at Nashwauk, in the county of Itasca and State of Minnesota, have invented certain new and useful Improvements in Fish-Screens, of which the following is a specification.

This invention relates to fish screens or traps of that general class especially designed for use in rivers, creeks, canals, irrigation ditches and the like.

The primary object of the invention contemplates the provision of a novel and peculiar fish trap wherein a plurality of automatically operated trap doors or "fish ways" (as they will be hereinafter referred to) are so positioned with respect to the water-way as to permit free passage of the fish in one direction, yet, should an attempt be made to return or pass in the opposite direction, such an attempt will be barred or frustrated, thus entrapping the fish without injury thereto.

The invention further aims to provide a fish stop or screen wholly automatic in its closing operation, and wholly operable during an opening operation by the force of the fish attempting to pass the barrier created by the stop or screen.

The invention still further resides in the provision of a fish way comprising a pair of substantially V-shaped sections, the adjacent flared extension of each section being maintained in yieldable engagement by the action of the flowing water upon the other or outer section, this arrangement of the said sections effecting a barrier for preventing the passage of fish in one direction in a manner to be hereinafter fully described.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 5:
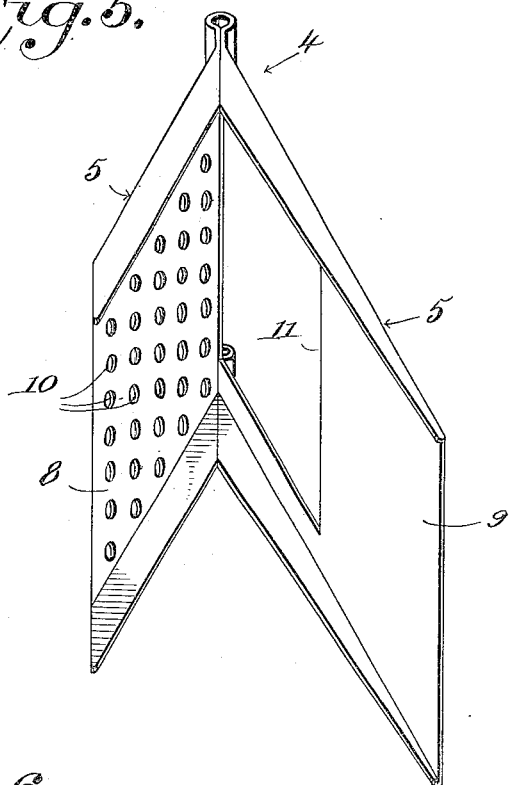
Figure 6:
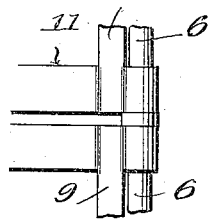
Figure 7:
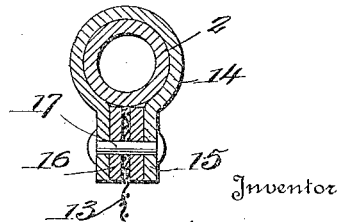

Figure 1 is a top plan view of a trap or screen arranged in its preferred form; Fig. 2 is a similar view, the arrangement of the screen being slightly modified; Fig. 3 is a top plan view of a single tier of fish ways, the dotted lines indicating the movement thereof; Fig. 4 is a side elevation of the screen illustrated in Fig. 3; Fig. 5 is a detail perspective view of one of the fish way sections; Fig. 6 is an enlarged fragmentary view illustrating the hinged connection of one of the fish-way sections; and Fig. 7 is an enlarged sectional view illustrating the manner in which the screen is secured to the frame of the device.

Referring now to the drawings by numerals, wherein is illustrated the preferred embodiment of my invention, 1 designates the bank or side of the water-way within which the stop or screen comprising the present invention is arranged. Extending transversely of, and from one to the other side of the water way, I provide a suitable frame 2, preferably composed of a plurality of jointed pipe sections, arranged in any suitable manner, and shaped to conform to the configuration of the bed of the water way within which it is positioned.

Referring now particularly to Fig. 1 wherein is illustrated one arrangement of the stop or screen, I provide upon one side of the frame 2 a suitable screen supporting frame 3, likewise composed of a plurality of jointed pipe sections, arranged in the manner illustrated with the pointed extremity of each screen pointing upstream to create a guide or trough adapted to direct the fish toward the fish ways designated as an entirety by the numeral 4 said ways being supported by the frame 2 and positioned upon the opposite side of the said frame from that of the screen 3. The said screen is preferably arranged to effect a plurality of substantially V-shaped guide ways, the diverged or wide open extremity of each guide being opened to the flow of the water, the direction of the flow being indicated by the arrows in the drawings. The converged end of each guide is sufficiently spaced to provide for the arrangement and operation of the fish-ways 4, which fish ways are composed of a pair of duplicate substantially V-shaped fish way sections designated 5, the converged or pointed extremity of each section being hingedly connected to suitable vertical uprights or perpendicular frame sections. One of the extensions of the said section 5 being somewhat elongated, it is apparent that the action of the flowing water thereupon will normally maintain the other of the extensions of the said sections in yieldable engagement at all times. The fish ways 4 are positioned one directly above the other, the number of the said fish ways being varied according to the depth of the water way within which they are used.

It being a well known fact that the larger fish tend to follow the center of the water way and the smaller fish the bank or sides thereof, and to render the action of the fish positive when attempting to pass the barrier formed by the device or screen comprising the present invention, the fish ways 4 at the sides of the water ways are comparatively small to provide for actuation by fish insignificant or of smaller size. In Fig. 2 of the drawings, the arrangement of the fish ways 4 is slightly different from that illustrated in Fig. 1, in the said Fig. 2, the larger fish ways are disposed exactly in the center of the water way and the guide way leading thereto is double the length of the guide ways illustrated in the said Fig. 1. The arrangement illustrated in this figure (referring to Fig. 2) is particularly adaptable for smaller streams or water ways to exclude fish comparatively large in size. In Fig. 3 a single tier of fish ways also designated 4 have been provided, the said ways being arranged, one directly above the other, as is illustrated to advantage in Fig. 4 of the drawings to which the description now under way appertains, each fish way as above stated comprising a pair of independent fish way sections designated 5, the said sections being each substantially V-shaped and hingedly connected to the uprights 6 carried by the frame 2 of the device. The outer or elongated extensions of the said sections 5 being in the path of the flowing water, it is apparent that the inner adjacent extensions of the said sections are normally maintained in engagement one with the other to close communication between the opposite sides of the spaced V-shaped screens 7 arranged upon the opposite side of the frame 2 from that upon which the fish ways 4 are disposed. The opposite side of the screens 7 form the guide to the fish ways 4, thereby directing the fish within the water way to the engaging extensions of the said sections 5.

Referring now to the detail description of the fish ways, the said ways are constructed as follows: Each section of the said fish ways being in duplicate, but one section will be described in detail. As above stated, each said section is substantially V-shaped and comprises an inner comparatively short extension 8, and an outer elongated extension 9, the former being provided with a plurality of apertures 10 to permit unobstructed passage of the flowing water therethrough, and to relieve, to some extent, the pressure of the water, that would be otherwise borne by the said shorter extension 8. The extension 9 is provided with an opening 11 at its inner or converged end, the said opening being provided for the purpose of permitting fish, in attempting to reënter that portion of the water way from whence they originally came, to enter the space between the substantially V-shaped screens 11 above mentioned. Each section 5 is pivotally connected to the upright frame section 6, the said sections being disposed in parallel spaced relation as is illustrated to advantage in Fig. 4 of the drawings to provide for the operation or actuation of one fish way entirely independent of the fish way above or below.

In Fig. 7, I have illustrated in detail the manner in which the wire mesh screen designated 13 is secured to the frame 2. A suitable bracket 14 is arranged to embrace the pipe section of which the frame 2 is composed, the extensions 15 of the said bracket serving as clamping jaws between which strips 16 are clamped, the said strips having the wire mesh 13 interposed therebetween. Any suitable retaining element such as the rivets or bolts 17 may be provided for maintaining the jaws of the bracket 14 in clamped position.

Having described in detail the construction and arrangement of several forms of the present invention, it now remains to set forth the operation of the device. As before stated, the screen is so positioned within the water way as to provide for the passage of the fish down stream, and, after passing the barrier in a manner to be hereinafter described, to prevent the repassage of the fish upstream or in opposite direction. In coming down stream, or in the direction indicated by the arrows in Figs. 1, 2 and 3 of the drawings, the fish will come in contact with the substantially V-shaped screen 3 and, by the guide-ways formed thereby, will be directed toward the fish ways 4 supported by the frame 2. In following the course of the stream, the fish having been directed to the fish ways 4, force their way against the inner extension 8 of the said ways, and, by exerting sufficient force thereupon, separate the said section 5 of the said ways thus permitting the fish to pass therebetween. After passing, the action of the flowing water upon the elongated extension 9 of the sections 5 will automatically return the said sections to their normal position with the adjacent or inner sections 8 in yieldable engagement one with the other, thus positioning the said fish way in the desired manner. The fish having once passed the fish ways 4 cannot reënter that portion of the water way from whence it came, as the lateral faces of the adjacent extensions 8 are so positioned to force the said extension, by exerting pressure thereupon normally in engagement with one another, and at the same time directing the fish toward the opening 11 in the elongated extension 9 where it is free to pass therethrough into the space between the screen 7 of the device.

In water ways wherein the current is exceptionally strong, the device may be inclined slightly upstream to offset the effect of the swiftly flowing water against the elongated extension 9 of the fish ways, while in a stream of moderate current, the device is arranged perpendicularly or in the manner illustrated in Fig. 4 of the drawings. In still water, the device is positioned upon an incline to thus enable the adjacent extensions 8 of the fish ways to be normally maintained in engagement one with the other by the weight of the elongated extension 9. If desired, the elongated extensions 9 may be entirely dispensed with, and weight members provided in their stead, the former however, it is thought, is better adaptable for the purpose of which the invention is designed.

It may be found, upon practical application to the invention, that it is advantageous to employ transparent material such as isinglass, to construct the fish ways or trap doors of the device, as it is a well known fact, that fish, will swim directly against the transparent material which, in the present invention would insure the opening of the section 5 and the passage of the fish to the space afforded therebetween. It is to be understood, of course, that a suitable screen is arranged upon the inner sde of and in spaced relation to the frame 2 to close passage between that portion of the water way within which the fish are entrapped and that portion upon the other side thereof.

From the above, taken in connection with the accompanying drawings, it is apparent that the device comprising the present invention is absolutely automatic in its operation; that the same may be readily utilized in streams with or without current; and that the arrangement of the fish ways may be varied to assume various positions without departing in any way from the spirit of the invention.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent is:—

1. A device for water ways including a fish way composed of a pair of movable sections, and means against which water impinges to normally maintain the sections in coacting relation.

2. A device for water ways including a fish way composed of a pair of relatively movable sections, and means on each section against which water impinges to normally maintain the sections in contiguous relation.

3. A device for water ways including a fish way composed of a pair of substantially V-shaped fish way sections, and means normally maintain the sections in coacting relation, as and for the purpose set forth.

4. A device for water ways including a plurality of fish ways composed of a pair of duplicate substantially V-shaped fish way sections, supports to which the said sections are pivotally connected, and means on said sections against which water impinges to normally maintain the sections in coacting relation, as and for the purpose set forth.

5. In a device for water ways, a fish way composed of a pair of relatively movable sections, the respective sections being complemental, means on each section against which water impinges to normally maintain the sections in contiguous relation, and guide means associated with each fish way to direct the fish thereto, as and for the purpose set forth.

6. In a device for water ways, a fish way composed of a pair of complemental substantially V-shaped sections, the remote extensions of the respective sections being enlarged, the said enlarged extensions being impinged by the water within the water way to normally maintain the adjacent extensions of the respective sections in coacting relation, support means for the respective sections, and guide means associated with each fish way to direct the fish thereto, as and for the purpose set forth.

7. A device for water ways including a suitable frame, a screen, a screen member supported by the said frame, the said screen member being positioned to provide a plurality of substantially V-shaped guide ways, a plurality of fish ways pivotally supported by the said frame at the converged end of each guide way, the said fish ways each comprising a pair of substantially V-shaped fish way sections, the adjacent extension of each section being normally maintained in yieldable engagement, such engagement being effected by the action of the water within the water way.

8. A device for water ways including a suitable frame, a screen member supported thereby, the said screen being positioned within the said water way to provide a plurality of substantially V-shaped guide ways, a plurality of fish ways carried by the said frame at the converged extremity of each guide way, each fish way comprising a pair of pivoted substantially V-shaped fish way sections, the inner adjacent extensions of each section being normally maintained in yieldable engagement, the outer extension of each section being elongated to normally maintain the said inner extension in yieldable engagement, the said outer extension being provided with openings, as and for the purpose set forth.

In testimony whereof I affix my signature in presence of two witnesses.

JAMES SEPPO.

Witnesses:
OSCAR JOHNSTON,
GUST RINNAN.